United States Patent [19]

Sickinger

[11] 3,972,109

[45] Aug. 3, 1976

[54] CUTTING FIXTURE FOR SPIRAL BINDERS AND METHOD OF MANUFACTURE

[75] Inventor: Albert E. Sickinger, Bloomfield Hills, Mich.

[73] Assignee: Hans Sickinger Co., Pontiac, Mich.

[22] Filed: Aug. 8, 1975

[21] Appl. No.: 603,000

[52] U.S. Cl. .................................. 29/434; 140/92.7; 140/92.94; 83/907

[51] Int. Cl.$^2$ ..................... B23P 11/00; B21F 35/02

[58] Field of Search ............ 83/907; 140/92.3, 92.7, 140/92.94, 103; 29/434

[56] References Cited

UNITED STATES PATENTS 2,649,120 8/1953 November ......................... 140/92.7

2,961,012 11/1960 Freundlich ......................... 140/92.3

*Primary Examiner*—Lowell A. Larson

*Attorney, Agent, or Firm*—Harness, Dickey & Pierce

[57] ABSTRACT

A fixture for cutting and inwardly bending the ends of spiral binders. The fixture comprises a body having parallel sides formed by a milled slot, the lower end of one side having an arcuate inward extension. A cutter pivotally mounted between the body sides has a complementary portion adjacent the curved extension and another portion spaced from the other side. The construction enables the end of a small diameter spiral having a large pitch to be trimmed in a manner which bends the end of the spiral inwardly a sufficient distance to bridge the gap to the next turn, thus preventing snags when books are stacked.

6 Claims, 4 Drawing Figures

CUTTING FIXTURE FOR SPIRAL BINDERS AND METHOD OF MANUFACTURE

BACKGROUND OF THE INVENTION

1. Field of the Invention

This invention relates to spiral binder applying machines for calendars, books or the like, and more particularly to the mechanisms for trimming and inwardly bending the ends of the spiral binders.

2. Description of the Prior Art

Biel and Pfaffle U.S. Pat. No. 2,963,049, Pfaffle U.S. Pat. No. 3,826,290 and Pfaffle U.S. application Ser. No. 553,253 filed Feb. 26, 1975, now U.S. Pat. No. 3,924,664, and assigned to the assignee of the present application, show spiral binder applying machines having trimming and bending cutters of this general type. The end trimming and bending operations are accomplished by cutters which descend at opposite ends of the spine and partially envelop and hold turns of the binder so that the cutting blades may accomplish the trimming and bending. Inward bending of the ends is necessary to bridge the gap between the outer and adjacent turns so that, when books are stacked, binders will not snag with each other.

A problem occurs when it is desired to form relatively small diameter coils which have large pitches, that is, greater turn-to-turn spaces. For example, one-quarter inch diameter coil can be made with five turns per inch or four turns per inch, and the latter construction will result in a substantial saving of wire for each binder. However, with less turns per inch (greater pitch), it is necessary to bend a longer end in order to bridge the gap.

The conventional cutting fixtures mentioned above cannot be readily constructed to accomplish this aim, since they cannot be designed to properly envelop and hold the adjacent turns so that the cutting blade may operate.

One solution has been to form one of the two cutter body arms with an inward extension of saw-tooth shape, the cutter having a complementary edge, so that the proper spacing may be achieved. However, this has necessitated manufacturing the cutter body in two pieces which must be later assembled. It also involves providing a relief on one of the body arms for the bend, a construction which is not as desirable as relieving the cutter blade, from the standpoint of design flexibility. This previous construction has been found unsatisfactory from cost and operational standpoints.

BRIEF SUMMARY OF THE INVENTION

It is an object of the present invention to overcome the drawbacks of previous cutting mechanisms for spiral binders and to provide a novel and improved cutting fixture and method of its manufacture especially adapted for small diameter, large pitch coils, which will enable the bent ends to bridge the gaps between the two end turns in order to prevent snagging.

It is another object to provide an improved cutting fixture of this nature which insures proper holding of the coil during the cutting and bending operation.

It is a further object to provide a cutting fixture construction of this type which is relatively inexpensive to manufacture and affords flexibility in the design for different sizes.

It is also an object to provide an improved cutting fixture of this nature, and a method of manufacture, which reduces the amount of necessary machining, thereby reducing cost.

It is another object to provide an improved cutting fixture which incorporates adjustable guides for the coil which are easily adjusted for different diameters.

Briefly, the illustrated embodiment of the invention comprises a body having parallel sides, one of said sides having an arcuate inward extension toward the slot between the sides adjacent the bottom of the slot, coil holding surfaces at the bottoms of the sides, a cutter blade pivotally mounted in said slot between the body sides, a curved portion on said cutter blade closely adjacent the arcuate extension of said one body side, and a relieved portion on the cutter blade adjacent the other body side.

In another aspect, the invention comprises a cutting fixture for a spiral wire binder comprising a supporting plate, a cutter blade and body secured to and depending from said plate, a pair of locating guide blocks on the underside of said plate in spaced parallel relation and adapted to embrace the spiral binder, and means for adjusting said locating guide blocks in a direction transverse to the axis of the spiral wire binder, comprising slots in said supporting plate and set screws extending through said slots and connected to said blocks.

In still another aspect, the invention comprises a method of manufacturing a cutting fixture comprising the steps of milling a vertical slot in a cutter body starting from the top so as to create parallel sides having facing surfaces, terminating said milling cut before the bottom of the body is reached whereby an arcuate surface is formed, forming coil-supporting surfaces on the lower portions of said sides, cutting out the bottom of said body flush with one surface of said two parallel surfaces until the milling cut is reached, said cut being of a width substantially less than the milling cutter width, whereby an arcuate extension is formed on the bottom of one side of the body extending toward the other side, forming a cutter blade having a surface portion complementary to said arcuate extension and a relieved portion adjacent said one surface, and pivotally mounting said cutter blade between said two body sides so that the two complementary surface portions are closely adjacent each other to provide a shearing action and the relieved portion of the blade will permit bending of the coil end.

DESCRIPTION OF THE PREFERRED EMBODIMENTS

Figure 1:
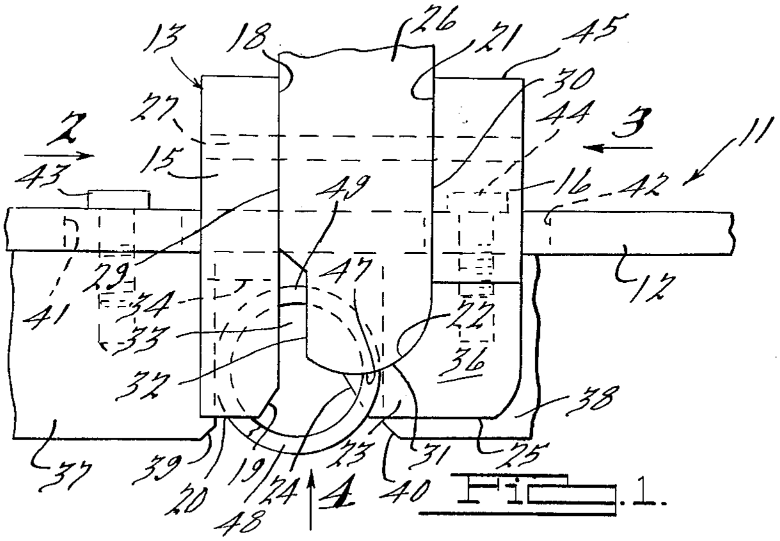
FIG. 1 is a front elevational view of the cutting fixture of this invention.
Figure 2:
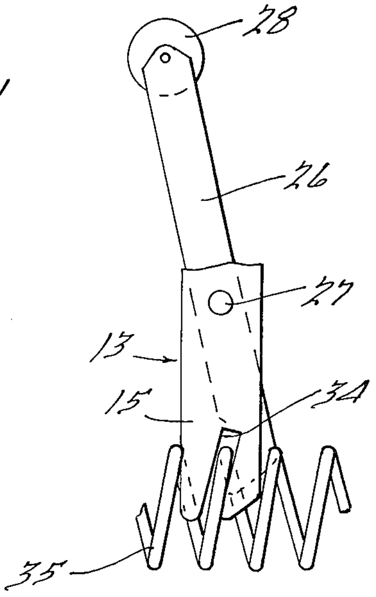
FIG. 2 is a side elevational view taken in the direction of the arrow 2 of FIG. 1.
Figure 3:
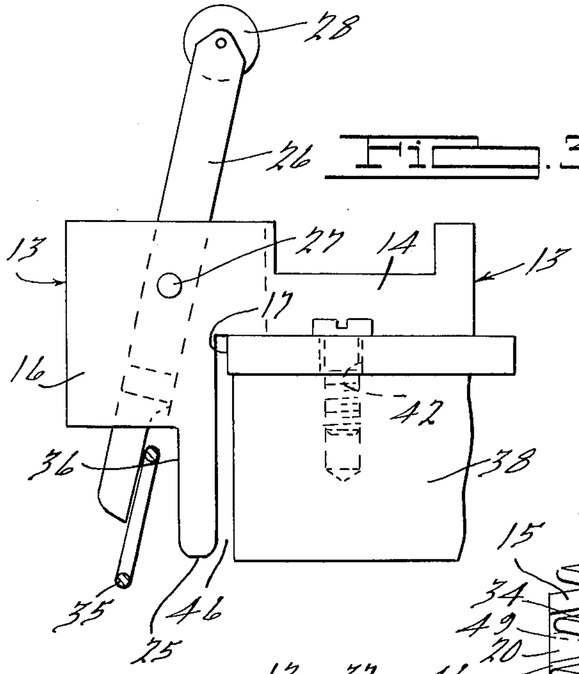
FIG. 3 is a side elevational view taken in the direction of the arrow 3 of FIG. 1.

The cutting fixture is generally indicated at 11 and comprises a supporting plate 12 adapted to be secured to a body generally indicated at 13. Body 13 has a portion 14 secured to a spiral binder applying machine of the type shown in the above-described patents and application, and plate 12 is secured to portion 14. Body 13 also has a pair of parallel sides 15 and 16 extending downwardly past edge 17 of plate 12. Side 15 has a flat surface 18 facing side 16 which extends downwardly to a bevelled portion 19, the bevelled portion in turn leading to a bottom 20. Side 16 has a flat surface 21 facing side 18 but this surface has an arcuate lower portion 22 forming part of an extension 23. Extension 23 terminates approximately equidistantly between surfaces 18 and 21, and a bevelled portion 24 leads to bottom 25 of side 16.

A cutter blade 26 is pivotally mounted in the slot between surfaces 18 and 21 by means of a pivot pin 27. Blade 26 extends upwardly from body 13 and has a roller 28 mounted at its upper end which coacts with cam means (not shown) during the cutting operation.

The sides 29 and 30 of blade 26 are closely adjacent surfaces 18 and 21 respectively. The cutter blade has a curved surface portion 31 which is closely adjacent the arcuate surface 22 of extension 23 on side 16. Surface 31 extends somewhat past the end of extension 23, and a relieved surface portion 32 is formed on cutter blade 26 on its lower portion at the side facing surface 18. This relieved portion of the cutter blade leaves a space 33 between surfaces 32 and 18.

The underside 20 of body side 15 has an inclined slot 34 formed therein for the reception of a coil of the spiral wire 35 which is to be trim-cut and bent. The depth of slot 34 is sufficient to enable body side 15 to engage a substantial portion of a coil of binder 35 when the cutter assembly descends. A coil holding surface 36 is also formed on the lower portion of body side 16. Surface 36 and slot 34 are so formed that the cutting fixture may complete its approach to the coil and then adequately support the coil for cutting purposes when cutting blade 26 is moved during a cutting stroke.

Locating guide blocks 37 and 38 are secured to the underside of plate 12 adjacent the body 13. These blocks are intended to embrace spiral binder 35 when the cutting fixture descends. For this purpose the blocks are provided with bevelled corners 39 and 40 respectively. However, means are provided for adjusting the distance between these blocks, this means being in the form of elongated slots 41 and 42 in plate 12 on opposite sides of body 13. Slots 41 and 42 extend transversely to the extent of spiral 35 and receive set screws 43 and 44 respectively which are threadably mounted in blocks 36 and 37. The arrangement is such that as the blocks may be moved together or apart by loosening the set screws and sliding them in slots 41 and 42.

A preferred method of manufacturing the cutting fixture comprises first milling a vertical slot in cutter body 13 starting from top 45 of the body so as to create parallel sides 18 and 21. This milling process is terminated before the bottom of body 13 is reached, whereby arcuate surface 22 is formed by the milling cutter which is chosen to have the desired radius. Coil-supporting surfaces 34 and 36 are then formed in the lower portions of sides 15 and 16. A cut substantially narrower than that formed by the milling cutter is then formed perpendicular to the bottom 20, 25 of body 13, one side of this cut being flush with surface 18, until the milling cut is reached whereby the arcuate extension 23 is formed on the bottom of side 16 of the body extending toward side 15. In addition to bevels 19 and 24, a relief 46 may be provided on the back of the lower portion of body 13 for the turn of the binder adjacent that being cut. Cutter blade 25 is formed to have surface portion 31 complementary to arcuate extension 23 and relieved surface 32 adjacent surface 18. the cutter blade is then pivotally mounted between sides 15 ad 16 so that the two complementary surface portions 22 and 31 are closely adjacent each other to provide a shearing action and the relieved portion 32 of the blade will permit bending of the coil end.

Figure 4:
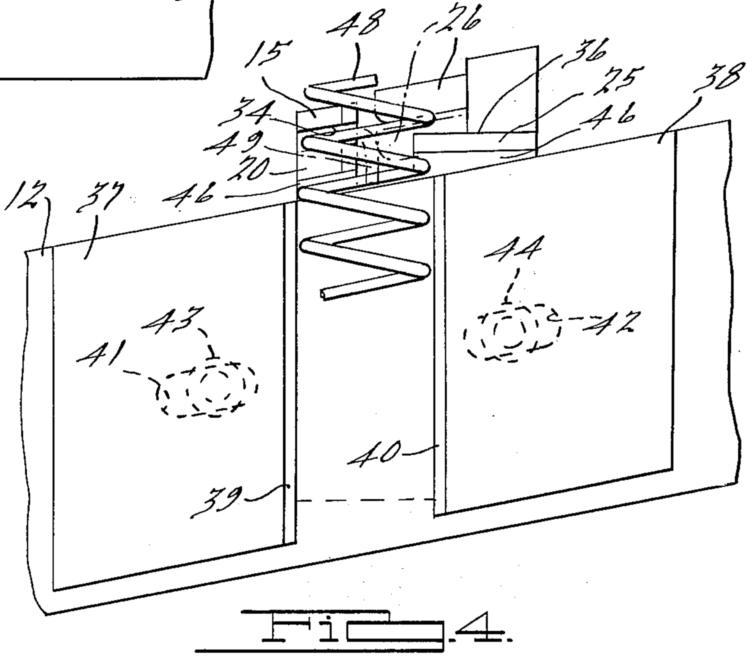
FIG. 4 is a bottom plan view of the fixture taken in the direction of the arrow 4 of FIG. 1.

In operation, cutting blade 26 is shown in solid lines in FIG. 4 when in its pre-cutting position and in dot-dash lines after cutting. Fixture 11 having descended until blocks 37 and 38 embrace the coil adjacent body 13 and an ample portion of a coil is supported by surface 36 and the corresponding surface of slot 34, cutting blade 26 will be swung by the cam which engages roller 28. The coil will be severed at 47 in FIG. 1 so that the portion 48 (FIG. 4) will be discarded. However, the space 33 will permit end 49 of the binder to be bent toward the adjacent coil by the continued movement of blade 26 to its dot-dash line position, until end 49 bridges the gap between the coils.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A fixture for cutting and inwardly bending an end of a spiral wire binder, comprising a body having parallel sides, one of said sides having an arcuate inward extendion toward the slot between the sides adjacent the bottom of the slot, coil-holding surfaces at the bottoms of the sides, a cutter blade pivotally mounted in said slot between the body sides, a curved portion on said cutter blade closely adjacent the arcuate extension of said one body side, and a relieved portion on the cutter blade adjacent the other body side.

2. A cutting fixture according to claim 1, one of said coil-holding surfaces comprising a slot in the bottom of one of said sides, the other holding surface comprising a relieved portion on the bottom of the other side.

3. A cutting fixture according to claim 1, further comprising a pair of locating guide blocks for embracing opposite sides of the spiral binder, a supporting plate, said fixture body being secured to and depending from said plate, and means adjustably securing said locating guide blocks to the underside of said plate for movement toward and away from each other.

4. A cutting fixture according to claim 3, said last-mentioned means comprising a pair of slots in said plate extending transversely to the spiral binder axis, and set screws extending through said slots and engaging said locating guide blocks.

5. A cutting fixture for a spiral wire binder comprising a supporting plate, a cutter blade and body secured to and depending from said plate, a pair of locating guide blocks on the underside of said plate in spaced parallel relation and adapted to embrace the spiral binder, and means for adjusting said locating guide blocks in a direction transverse to the axis of the spiral wire binder, comprising slots in said supporting plate and set screws extending through said slots and connected to said blocks.

6. A method of manufacturing a cutting fixture comprising the steps of milling a vertical slot in a cutter body starting from the top so as to create parallel sides having facing surfaces, terminating said milling cut before the bottom of the body is reached whereby an arcuate surface is formed, forming coil-supporting surfaces on the lower portions of said sides, cutting out the bottom of said body flush with one surface of said two parallel surfaces until the milling cut is reached, said cut being of a width substantially less than the milling cutter width, whereby an arcuate extension is formed on the bottom of one side of the body extending toward the other side, forming a cutter blade having a surface portion complementary to said arcuate extension and a relieved portion adjacent said one surface, and pivotally mounting said cutter blade between said two body sides so that the two complementary surface portions are closely adjacent each other to provide a shearing action and the relieved portion of the blade will permit bending of the coil end.

* * * * *